United States Patent [19]
Sakashita et al.

[11] Patent Number: 5,026,817
[45] Date of Patent: Jun. 25, 1991

[54] CATALYTIC PROCESS FOR PREPARING POLYCARBONATES FROM CARBONIC ACID

[75] Inventors: Takeshi Sakashita; Tomoaki Shimoda, both of Kuga, Japan

[73] Assignee: GE Plastics Japan, Ltd., Tokyo, Japan

[21] Appl. No.: 377,272

[22] Filed: Jul. 10, 1989

[30] Foreign Application Priority Data

Jul. 11, 1988 [JP] Japan ................................ 63-172297
Sep. 22, 1988 [JP] Japan ................................ 63-238427

[51] Int. Cl.$^5$ .............................................. C08G 64/30
[52] U.S. Cl. .................................... 528/199; 528/196; 528/198; 528/200
[58] Field of Search ................ 528/199, 200, 198, 196

[56] References Cited

U.S. PATENT DOCUMENTS 4,839,458  6/1989  Koga et al. ........................ 528/196
4,880,896  11/1989  Otsubo et al. ..................... 528/196

Primary Examiner—Harold D. Anderson
Attorney, Agent, or Firm—Sherman and Shalloway

[57] ABSTRACT

A process for preparing polycarbonates according to the invention by melt polycondensation of aromatic dihydroxy compounds and carbonic acid diesters, is characterized by using an aromatic dihydroxy compound and a carbonic acid diester, wherein the combined content of hydrolyzable chlorine in those monomers falls within the particular range. Another process for preparing polycarbonates according to the invention by melt polycondensation of aromatic dihydroxy compounds and carbonic acid diesters, is characterized by using a catalyst comprising (a) a nitrogen containing basic compound and (b) aromatic hihydroxy compound of an alkali metal or alkaline earth metal compound, or (a) and (b) and (c) boric acid or boric ester.

13 Claims, No Drawings

CATALYTIC PROCESS FOR PREPARING POLYCARBONATES FROM CARBONIC ACID

FIELD OF THE INVENTION

This invention relates to processes for preparing polycarbonates and more particularly to processes for preparing polycarbonates which have high molecular eights, excellent heat resistance and water resistance and, moreover, which have been improved in color tone.

BACKGROUND OF THE INVENTION

Because of their excellent mechanical characteristics, such as impact resistance, and because of their excellent heat resistance and transparency, polycarbonates are widely used for various purposes. Known as the method for the preparation of polycarbonates as referred to above is a process (interface method) which involves a direct reaction of aromatic dihydroxy compounds such as bisphenol with phosgene, or a process in which aromatic dihydroxy compounds such as bisphenol and carbonic diesters such as diphenyl carbonate are allowed in molten state to undergo ester interchange reaction (polycondensation reaction).

In a process for preparing polycarbonates by ester interchange reaction of aromatic dihydroxy compounds with carbonic diesters, usually the reactants are heated under reduced pressure at a temperature of 250°-330° C. and allowed In molten state to undergo the ester interchange reaction in the presence of catalysts such as organic acid salts, inorganic acid salts, oxides, hydroxides or hydrides of metals or alcoholates. This process is advantageous over the above-mentioned interface method in that polycarbonates can be prepared at a relatively low cost. In this process, however, the aromatic dihydroxy compound and the carbonic acid diester are reacted in molten state, and the polycarbonate being formed is exposed to elevated temperatures for a prolonged period time, and in consequence, there has been posed such a serious problem that the product assumes a yellow color, and becomes poor in heat resistance or water resistance. For this reason, polycarbonates prepared by this process have hardly found application in field such as plastic glass and lenses where materials having a good color tone are required.

Furthermore, Japanese Patent Laid-Open-to-Public Publn. No. 51719/1985 proposes a process for preparing polycarbonates, which involves the use of catalysts comprising nitrogen containing basic compounds and boron compounds, and the desired polycarbonates assuming a relatively pale color are obtained by the proposed process when the catalysts as proposed are used therefor. However, the proposed catalysts involved such a problem that they are low in polymerization activity With the view of solving such problems as mentioned above, we conducted extensive research and eventually have accomplished the present invention on the basis of our finding that the purpose intended can be attained by carrying out the polycondensation of aromatic dihydroxy compounds with carbonic diesters either using starting monomers having a reduced content of a specific impurity or in the presence of a specific catalyst.

OBJECT OF THE INVENTION

The present invention is intended to solve such problems associated with the prior art as mentioned above and an object of the invention is to provide processes for preparing polycarbonates, said processes being capable of obtaining the polycarbonates which have high molecular weight and are excellent in heat resistance and water resistance and, moreover, which are improved in color tone.

SUMMARY OF THE INVENTION

A first process for preparing polycarbonates according to the invention by melt polycondensation of aromatic dihydroxy compounds and carbonic acid diesters used as monomers, is characterized by using an aromatic dihydroxy compound and a carbonic acid diester, the combined content of hydrolyzable chlorine in said monomers falling within the following range.

Hydrolyzable chlorine content: not more than 3 ppm

A second process for preparing polycarbonates according to the invention by melt polycondensation of aromatic dihydroxy compounds and carbonic acid diesters used as starting monomers, is characterized by using an aromatic dihydroxy compound and a carbonic acid diester, the combined content of hydrolyzable chlorine, the combined content of sodium ion and the combined content of iron ion in said monomers respectively falling within the following ranges.

Hydrolyzable chlorine content: not more than 3 ppm
Sodium ion content: not more than 1.0 ppm
Iron ion content: not more than 1.0 ppm In the first process for preparing polycarbonates according to the invention there are used as starting monomers an aromatic dihydroxy compound and a carbonic acid diester having a combined content of hydrolyzable chlorine not more than a specific level. In the second process for preparing polycarbonates according to the invention there are used as starting monomers an aromatic dihydroxy compound and a carbonic acid diester having a combined of hydrolyzable chlorine, a combined content of odium ion and a combined content of iron ion respectively not more than specific levels. By these processes there can be prepared polycarbonates which do not assume undesirable colors such as yellow, and which are excellent in color tone, heat resistance, water resistance and boiling water resistance.

A third process for preparing polycarbonates according to the invention by melt polycondensation of aromatic dihydroxy compounds and carbonic acid diesters, is characterized by using a catalyst comprising (a) a nitrogen containing basic compound, and
(b) from $10^{-8}$ to $10^{-3}$ mole, based on 1 mole of the aromatic dihydroxy compound, of an alkali metal or alkaline earth metal compound.

A fourth process for preparing polycarbonates according to the invention by melt polycondensation of aromatic dihydroxy compounds and carbonic diesters, is characterized by using a catalyst comprising (a) a nitrogen containing basic compound,
(b) from $10^{-8}$ to $10^{-3}$ mole, based on 1 mole of aromatic dihydroxy compound, of an alkali metal or alkaline earth metal compound, and
(c) boric acid or boric acid ester.

The third and fourth processes according to the invention wherein an aromatic dihydroxy compound is melt polycondensed with a carbonic acid diester in the presence of specific catalysts, are productive of polycarbonates which have high molecular weight, excellent heat resistance and water resistance and, moreover which are improved in color tone.

DETAILED DESCRIPTION OF THE INVENTION

The processes for preparing polycarbonates of the present invention will be illustrated below in detail.

In the present invention, the polycarbonates are prepared from aromatic dihydroxy compounds and carbonic diesters as starting materials.

The aromatic dihydroxy compounds used in the present invention are those which are represented by the following general formula [I]

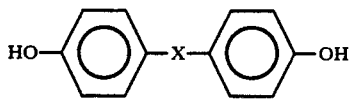     [I]

wherein X is

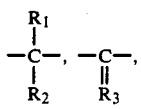

—O—, —S—, SO— or —SO$_2$—, $R_1$ and $R_2$ are each a hydrogen atom or a monovalent hydrocarbon group, $R_3$ is a divalent hydrocarbon group, and the aromatic nuclei may by substituted by a monovalent hydrocarbon group or groups.

Useful aromatic dihydroxy compounds as illustrated above include in the concrete bis(hydroxyaryl) alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)-phenylmethane, 2,2 bis(4 hydroxy 1 methylphenyl)propane, 1,1-bis(4-hydroxy-t-butylphenyl) propane, and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Of the compounds as exemplified above, particularly preferred is 2,2 bis(4 hydroxyphenyl)propane.

Useful carbonic diesters include in the concrete diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate.

Of the diesters as exemplified above, particularly preferred is diphenyl carbonate.

The carbonic diester used herein may contain a minor amount, e.g., up to 50 mole, preferably up to 30 mole, of a dicarboxylic acid or its ester. Examples of such dicarboxylic acids and esters thereof, include, for example, terephthalic acid, isophthalic acid, diphenyl terephthalate and diphenyl isophthalate. When such a dicarboxylic acid or its ester is conjointly used polyesterpolycarbonate is prepared.

In preparing polycarbonates by carrying out the process of the present invention, it is desirable that the above-mentioned carbonic diester is used in an amount of 1.01 to 1.30 moles, preferably 1.02 to 1.20 moles based on 1 mole of the aforementioned aromatic dihydroxy compound.

In the first and second processes according to the invention a combined content of hydrolyzable chlorine contained in the aromatic dihydroxy compound and the carbonic acid diester should be not more than 3 ppm, preferably not more than 2 ppm, and more preferably not more than 1 ppm.

The term "hydrolyzable chlorine" means chlorine which is present in the form of salts such as sodium chloride and potassium chloride. A content of hydrolyzable chlorine contained in each starting material used herein can be determined by analysis, for example, ion chromatography of an extract of the material with water.

If the combined content of hydrolyzable chlorine contained in the starting monomers exceeds 3 ppm, color tone of the product tends to become poor.

It is also desirable in the present invention that a hydrolyzable chlorine content of the starting carbonic acid diester is not more than 2 ppm, preferably not more than 1 ppm, and more preferably not more than 0.5 ppm.

Conventionally, the starting aromatic dihydroxy compound and carbonic acid diester (in particular carbonic acid diester prepared by the so-called phosgen process) are purified by distillation or recrystallization, and thereafter subjected to melt polycondensation. However, it is generally difficult to reduce the combined hydrolyzable chlorine content of the starting monomers by mere distillation below the desired level. This is especially true with carbonic acid diesters prepared by the phosgen process which may contain hydrolyzable chlorine in the form of phenyl chloroformate.

It has been found that even with carbonic acid esters prepared by the phosgen process the content of hydrolyzable chlorine can be easily reduced below 2 ppm by washing with hot water having a pH of from 6 0 to 9.0, preferably from 7.0 to 8.5, and more preferably from 7.0 to 8.0, and kept at a temperature of from 78 to 105° C., preferably from 80 to 100° C. and more preferably from 80 to 90° C.

Examples of the aqueous weak alkaline solution which can used herein include, for example, those of sodium hydroxide, potassium hydroxide, lithium hydroxide, sodium carbonate, potassium carbonate, ammonium hydroxide, sodium hydrogencarbonate, potassium hydrogencarbonate and tetramethylammonium hydroxide. Of these, aqueous solutions of sodium hydrogencarbonate, sodium carbonate, potassium hydrogencarbonate and potassium carbonate ar preferred.

The carbonic acid diester so washed with a hot weakly alkaline aqueous solution is used in the melt polycondensation either directly or preferably after having been distilled.

Incidentally, in the cases of carbonic acid diesters prepared by processes other than the phosgen process, such as carbonic acid diester prepared from dialkyl carbonates, it is sometimes possible to reduce the hydrolyzable chlorine content by mere distillation to 2 ppm or below.

It is also advantageous to use the aromatic dihydroxy compound and carbonic acid diester having not only the combined content of hydrolyzable chlorine reduced to not more than 3 ppm. but also the combined content of sodium ion reduced to not more than 1.0 ppm, preferably not more than 0.8 ppm. and more preferably not more than 0.6 ppm. Further it is also advantageous to use the aromatic dihydroxy compound and carbonic acid diester having the combined content of iron ion reduced to not more than 1.0 ppm, preferably not more than 0.8 ppm, and more preferably not more than 0.6 ppm. By doing so, polycarbonates of further improved color tone can be prepared.

The sodium ion content and the iron ion content in the aromatic dihydroxy compound and the carbonic acid diester may be determined by atomic-absorption spectroscopy or induced coupling plasma emission spectroscopy.

Suitable procedures to reduce the sodium ion content and the iron ion content in the aromatic dihydroxy compound and the carbonic acid diester include washing with a hot weakly alkaline aqueous solution, distillation and recrystallization.

The melt polycondensation of the aromatic dihydroxy compound and the carbonic acid diester in the first and second processes according to he invention can be carried out either in the presence of any catalysts that have heretofore been known as being useful in the reaction concerned or in the presence of novel catalysts proposed herein.

Examples of known catalysts, for example, those described in Japanese Patent Publications 36-694 and 36-13942, include acetates, carbonates, borates, oxides, hydroxides, hydrides and alcoholates of various metals including alkali metals such as lithium, sodium and potassium; alkaline earth metals such as magnesium, calcium and barium: and other metals such as zinc, cadmium, tin, antimony, lead, manganese, cobalt and nickel. Further, combinations of a nitrogen containing basic compound with boric acid or esters of boric acid or phosphorus compounds may be also used as catalysts in the first and second processes according to the invention.

These catalysts may be used in an amount, based on 1 mole of the aromatic dihydroxy compound, of normally from $10^{-6}$ to $10^{-1}$ mole, preferably from $10^{-5}$ to $10^{-2}$ mole.

The third and fourth processes according to the invention in which preferred catalysts are used will now be described.

As mentioned previously, in the third process for preparing polycarbonates of the present invention preparation of the polycarbonates by melt polycondensation of the aromatic dihydroxy compounds and the carbonic diesters is carried out by using a catalyst comprising (a) a nitrogen containing basic compound, and
(b) an alkali metal or alkaline earth metal compound.

Useful nitrogen containing basic compound as component(a) of the catalyst includes in the concrete tetraalkyl-, aryl- or alkarylammonium hydroxides such as tetramethylammonium hydroxide (Me₄NOH), tetraethylammonium hydroxide (Et₄NOH), tetrabutylammonium hydroxide (Bu₄NOH) and trimethylbenzylammonium hydroxide

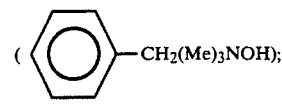

tertiary amines such as trimethylamine, triethylamine, dimethylbenzylamine and triphenylamine; secondary amines represented by $R_2NH$ (in the formula, R is alkyl such as methyl or ethyl, or aryl such as phenyl or toluyl); primary amines represented by $RNH_2$ (in the formula, R is as defined above); or basic salts such as ammonia, tetramethylammonium borohydride ($Me_4NBH_4$), tetrabutylammonium borohydride($Bu_4NBH_4$), tetrabutylammonium tetraphenyl borate($Bu_4NBPh_4$) and tetramethylammonium tetraphenyl borate ($Me_4NBPh_4$).

Of the basic compounds as exemplified above, particularly preferred are tetraalkylammonium hydroxides.

Useful alkali metal compound as component (b) of the catalyst includes in the concrete sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride and sodiumborophenylate, sodium benzoate, potassium benzoate, lithium benzoate, disodium hydrogenphosphate, dipotassium hydrogenphosphate, dilithium hydrogenphosphate, disodium salt of BPA, dipotassium salt of BPA, dilithium salt of BPA, sodium phenylate, potassium phenylate, lithium phenylate.

Furthermore, useful alkaline earth metal compound as component (b) of the catalyst includes in the concrete calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

The nitrogen containing basic compound (a) as exemplified above is used in an amount of $10^{-6}-10^{-1}$ mole, preferably $10^{-5}-10^{-2}$ mole, based on 1 mole of the aforementioned aromatic dihydroxy compound, and the alkali metal or alkaline earth metal compound (b) as exemplified above is used in an amount of $10^{-8}-10^{-3}$ mole, preferably $10^{-7}-10^{-4}$ mole, particularly preferably $10^{-7}-10^{-5}$ mole, based on 1 mole of the aforementioned aromatic dihydroxy compound.

The use of the nitrogen containing basic compound (a) in amount of $10^{-6}-10^{-1}$ mole based on 1 mole of the aromatic dihydroxy compound is desirable, because the rates of the ester interchange and polymerization reactions increased and, the resulting polycarbonates are excellent in color tone, heat resistance and water resistance.

Furthermore, the use of the alkali metal or alkaline earth metal compound in an amount of $10^{-8}-10^{-3}$ based on 1 mole of the aromatic dihydroxy compound is desirable, because the polymerization activity, particularly the rate of polymerization markedly increases and, the resulting polycarbonates are excellent in color tone, heat resistance and water resistance.

The catalyst which comprises such a combination of the nitrogen containing basic compound (a) and the alkali metal or alkaline earth metal compound (b) in the manner as illustrated above has a high polymerization activity and can form high molecular weight polycarbonates, when it is used in practicing the melt polycondensation of the aromatic dihydroxy compound and carbonic diester, according to the process for preparing polycarbonates of the present invention. In addition to that, the polycarbonate obtained thereby is excellent in heat resistance and water resistance, and what is more, it is improved in color tone and excellent in transparency.

Furthermore, in the fourth process for preparing polycarbonates of the present invention, preparation of the polycarbonates by melt polycondensation of aromatic dihydroxy compounds and carbonic diesters is carried out by using a catalyst comprising
(a) a nitrogen containing basic compound,
(b) an alkali metal compound or an alkaline earth metal compound, and
(c) boric acid or boric acid ester.

Useful nitrogen containing basic compound as component (a) of the catalyst and useful alkali metal or alkaline earth metal compound as component (b) of the catalyst are those as exemplified previously with respect to the third process according to the invention.

Useful boric acid or boric acid ester as component (c) of the catalyst includes boric acid and boric acid esters represented by the general formula $B(OR)_n(OH)_{3-n}$ (in the formula, R is alkyl such as methyl and ethyl, or aryl such as phenyl, and n is 1,2 or 3).

Concretely, such boric acid ester as illustrated above includes trimethyl borate, triethyl borate, tributyl borate, trihexyl borate, triheptyl borate. triphenyl borate, tritolyl borate and trinapthyl borate.

In the fourth process for preparing polycarbonates of the present invention, the nitrogen containing basic compound (a) is used in an amount of $10^{-6}-10^{-1}$ mole, preferably $10^{-5}-10^{-2}$ mole based on 1 mole of the aromatic dihydroxy compound, the alkali metal or alkaline earth metal compound (b) is used in an amount of $10^{-8}-10^{-3}$ mole, preferably $10^{-7}-10^{-4}$ mole, and more preferably $10^{-7}-10^{-5}$ mole based on 1 mole of the aromatic dihydroxy compound, and the boric acid or boric acid ester (c) is used in an amount of $10^{-8}-10^{-1}$ mole, preferably $10^{-7}-10^{-2}$ mole, and more preferably $10^{-6}-10^{-4}$ mole base on 1 mole of the aromatic dihydroxy compound.

The use of the nitrogen containing basic compound (a) in an amount of $10^{-6}-10^{-1}$ mole based on 1 mole of the aromatic dihydroxy compound is desirable, because the rates of ester interchange and polymerization increase and, the resulting polycarbonates are excellent in color tone, heat resistance, and water resistance.

The use of the alkali metal or alkaline earth metal compound (b) in an amount of $10^{-8}-10^{-3}$ mole based on 1 mole of the aromatic dihydroxy compound is desirable, because the rate of polymerization increases and, the resulting polycarbonates are excellent in color tone, water resistance and heat resistance.

Furthermore, the use of boric acid or boric acid ester (c) in an amount of $10^{-8}-10^{-1}$ mole based on 1 mole of the aromatic dihydroxy compound is desirable, because the decrease of the molecular weight after heat aging was restrained and, the resulting polycarbonates are excellent in color tone, water resistance, and heat resistance.

The catalyst used in the third process according to the invention comprising a combination of the nitrogen containing basic compound (a), and alkil metal compound (b), and the catalyst used in the fourth process according to the invention comprising a combination of the nitrogen containing basic compound (a), alkil metal or alkaline earth metal compound (b) and boric acid or its ester (c), are found much higher in polymerization activity than known catalysts for the same melt polycondensation. They can form high molecular weight polycarbonates which are excellent in heat resistance and water resistance and improved in color tone and transparency.

In the third and fourth processes for preparing polycarbonates according to the invention, it is preferred that the starting aromatic dihydroxy compound and carbonic diester have combined contents of hydrolyzable chlorine, sodium ion and iron respectively falling within the range prescribed hereinabove, but such is not always necessary.

In the first and second processes for preparing polycarbonates according to the invention, the melt polycondensation may be carried out in the presence of any suitable catalysts including not only those which have heretofore been used for the same reaction, those described hereinbefore with respect to the third and fourth processes according to the invention, but also catalysts comprising a combination of the above-mentioned nitrogen containing basic compound (a), and alkali metal or alkaline earth metal compound (b) or a combination of the above mentioned alkali metal or alkaline earth metal compound (b) and boric acid its ester (c).

The polycondensation reaction of the aromatic dihydroxy compound with carbonic diester in the processes according to the invention may be carried out under the same conditions conventionally known as those commonly employed therefor. Concretely, a first stage reaction of the aromatic dihydroxy compound with carbonic diester is carried out under ordinary pressure at a temperature of 80°-250° C., preferable 100°-230° C., and more preferably 120°-190° C., for 0-5 hours, preferably 0-4 hours, and more preferably 0.25-3 hours. Subsequently, the system is evacuated and the reaction temperature is elevated to carry out the reaction of the aromatic dihydroxy compound with carbonic diester, and finally the polycondensation reaction of the aromatic dihydroxy compound with carbonic diester is carried out under reduced pressure of less than 1 mmHg at a temperature of 240°-320° C.

The reaction of the aromatic dihydroxy compounds with carbonic diesters as illustrated above may be carried out by either continuous or batchwise process. Furthermore reaction apparatuses in which the above-mentioned reaction is carried out may be of a tank, tube or column type.

EFFECT OF THE INVENTION

By the first process for preparing polycarbonates according to the invention wherein an aromatic dihydroxy compound and a carbonic acid diester used as starting monomers have a combined content of hydrolyzable chlorine not more than a specific level, or have, in addition to such a combined level of hydrolyzable chlorine, a combined content of sodium ion and a combined content of iron ion respectively not more than specific levels, there can be prepared polycarbonates which do not assume undesirable colors such as yellow, and which are excellent in color tone, heat resistance, water resistance and boiling water resistance.

The third and fourth processes according to the invention wherein an aromatic dihydroxy compound is melt polycondensed with a carbonic acid diester in the presence of specific catalysts, are productive of polycarbonates which have high molecular weight, excellent heat resistance and water resistance and, moreover which are improved in color tone.

The present invention is illustrated below with reference to examples, but it should be constructed that the invention is in no way limited to those examples.

TESTING METHOD

Methods of measurement of physical properties employed are shown below.

Intrinsic viscosity (IV): The test specimen was measured for intrinsic viscosity at 20° C. in methylene chloride using a Ubbelohde's viscometer.

Hue (b value): The test specimen of a press sheet of a 2mm thickness was measured for Lab values by the transmission method using Color and Color Difference Meter ND-1001 Dp manufactured and sold by Nippon Denshoku Kogyo K.K., and the measured b value was taken as an index of yellowness.

Heat aging test: pellets of the test specimen were dried at 120° C. under 400 mmHg for 12 hours, and 4.5 g of the pellets thus dried was kept for 16 hours at 250° C. in a gear oven (GHPS-212 manufactured and sold by Tabai Seisakusho K.K., air replacement ratio 71.6 times/hr.), and then cooled to room temperature. The test specimen thus treated was formed into a press sheet of 2 mm thick, and measured for hue(b value) and IV.

Boiling water test: A dumbbell of 5 mm width x 5 cm length was punched out from a press sheet of 0.5 mm thickness, immersed in boiling water, and withdrawn therefrom after the lapse of 1 day, 3 days and 7 days, respectively. Within 1 hour after the removal, the dumbbell thus treated was subjected to tensile test with Instron 1132 under the conditions a distance of 30 mm between zippers, a rate of pulling of 50 mm/min, and a range of measurement of 50 kg, thereby measuring a value of elongation (%).

CONDITIONS OF PREPARATION OF PRESS SHEET: Pellets of the test specimen were dried for 12 hours at 120° C. under 400 mmHg, maintained for 10 minutes under nitrogen atmosphere. Thereafter, the pellets were pressed for 5 minutes at 280° C. and 100 kg/cm², and then pressed for 5 minutes at room temperature for cooling.

Hydrolyzable chlorine content: Five g of a material was dissolved in 10 ml of toluene. After addition of 10 ml of an eluent (2.8 mM of $NaHCO_3$ 2.25 mM of $Na_2CO_3$), the solution was extracted with water. The chlorine content of the extract was determined by ion chromatography(using Ion chrophatograph 2000i supplied by DIONEX K.K.).

Sodium ion content: Sodium content of a material was determined on 20 g of the material by atomic-absorption spectroscopy (using HITACHI 180-80).

Iron content: Iron content of a material was determined on 20 g of the material by induced coupling plasma emission spectroscopy (using NJA ICPA 575supplied by Nippon Jarrelasch K.K.).

EXAMPLE 1

Diphenyl carbonate supplied by BAYER A G. having a hydrolyzable chlorine content of 5.9 ppm was washed with hot water at a temperature of 80° C. and a pH of 7.0, and distilled under reduced pressure at a yield of 90% to provide diphenyl carbonate having a hydrolyzable chlorine content of 0.3 ppm.

In a glass reactor 51.36 g(0.24 mole) of the so treated diphenyl carbonate, 45.6 g (0.2 mole) of Bisphenol A having a hydrolyzable chlorine content of 0.2 ppm supplied by GE corporation and 3.1 mg($2.5 \times 10^{-4}$ mole/mole of BAP) of boric acid $H_3BO_3$ (guaranteed reagent supplied by WAKO K.K. was stirred using a stirrer made of Ni, under a nitrogen atmosphere at a temperature of 180° C. and under a pressure of 760 mmHg for a period of 30 minutes. At the end of the period there were added to the reactor 30.4 mg of 15% tetramethylammonium hydroxide $Me_4NOH$ aqueous solution supplied by TOYO GOSEI K.K. ($2.5 \times 10^{-4}$ mole of $Me_4NOH$/mole of BPA) and 0.42 mg ($0.25 \times 10^{-4}$ mole/mole of BAP) of sodium hydrogencarbonate $NaHCO_3$ guaranteed reagent supplied by WAKO K.K., and the mixture was stirred for further 30 minutes at a temperature of 180° C. under nitrogen atmosphere to effect the ester interchange reaction.

The reaction mixture was then heated to a temperature of 210° C. and the pressure was slowly reduced to 200 mmHg. The mixture was maintained under these conditions for 1 hour, and further maintained for 20 minutes at 240° C. and 200 mmHg. The pressure was then slowly reduced to 150 mmHg, and the mixture was maintained at 240° C. for 20 minutes under this pressure and for further 20 minutes under 100 mmHg, for 0.5 hour under 15mmHg. Finally, the temperature was then raised to 270° C. and the pressure was reduced to 0.5 mmHg, and the reaction was continued under these conditions for 2.5 hours. Polycarbonate having an intrinsic viscosity of 0.55 was obtained. The b value of the product was 1.3.

The results are shown in Table 1.

EXAMPLES 2 AND 3

Diphenyl carbonates (DPC) having hydrolyzable chlorine sodium ion and iron ion contents indicated in Table 1 were prepared in the same manner as in Example except that the recovery yield of DPC at the stage of distillation under reduced pressure was varied. Using the so prepared DPC polycarbonates were prepared following the procedures of Example 1.

The results are shown in Table 1.

EXAMPLE 4

Example 1 was repeated except that the purified BAYER DPC was replaced with DPC obtained by distillation of DPC supplied Eni company which had been prepared from dimethyl carbonate.

The results are shown in Table 1.

COMPARATIVE EXAMPLE 1

Example 1 was repeated except that the unpurified DPC as such was used in the melt polycondensation.

The results are shown in Table 1.

COMPARATIVE EXAMPLE 2

Example 1 was repeated except that instead of the purified BAYER DPC undistilled by DPC supplied by Eni company was used in the melt polycondensation.

The results are shown in Table 1.

TABLE 1

|  | Starting material | Ex. 1 | Ex. 2 | Ex. 3 | Ex. 4 | Comp. Ex. 1 | Comp. Ex. 2 |
|---|---|---|---|---|---|---|---|
| Starting material | DPC Hydrolyzable Cl (ppm) | 0.30 | 0.20 | 0.10 | 0.09 | 5.90 | 4.12 |
|  | Na ion (ppm) | <0.05 | <0.05 | <0.05 | <0.05 | 0.10 | 1.10 |
|  | Fe ion (ppm) | 0.15 | 0.10 | 0.05 | 0.07 | 0.40 | 1.18 |
|  | Bisphenol A |  |  |  |  |  |  |
|  | Hydrolyzable Cl (ppm) | 0.20 | 0.20 | 0.20 | 0.20 | 0.20 | 0.20 |
|  | Na ion (ppm) | 0.06 | 0.06 | 0.06 | 0.06 | 0.06 | 0.06 |
|  | Fe ion (ppm) | 0.21 | 0.21 | 0.21 | 0.21 | 0.21 | 0.21 |
| Physical properties of the product | IV (dl/g) | 0.55 | 0.54 | 0.54 | 0.53 | 0.50 | 0.53 |
|  | b value | 1.3 | 1.2 | 1.0 | 0.9 | 2.0 | 2.1 |
|  | Heat resistance 250° C. × 16 hr IV (dl/g) | 0.50 | 0.49 | 0.49 | 0.48 | 0.39 | 0.40 |
|  | color tone b value | 21.3 | 21.2 | 20.8 | 20.9 | 34.5 | 34.8 |
|  | Boiling water resistance |  |  |  |  |  |  |
|  | Elongation (%) after in boiling water for |  |  |  |  |  |  |
|  | 0 day | 97.0 | 98.1 | 103.5 | 102.1 | 87.3 | 93.2 |
|  | 1 day | 57.4 | 61.5 | 62.7 | 61.3 | 43.5 | 35.4 |
|  | 3 day | 24.7 | 29.3 | 31.5 | 32.5 | 12.3 | 11.6 |
|  | 7 day | 21.4 | 23.2 | 25.3 | 26.4 | 7.6 | 5.3 |

EXAMPLE 8

Into a 100 ml glass reactor was charged a mixture comprising 47.9 g (0.22 mole) of diphenyl carbonate used in Example 12, 4.56 g (0.20 mole) of Bisphenol A used in Example 12 and 3.7 mg ($3 \times 10^{-4}$ mole/BPA 1 mole) of boric acid (guaranteed reagent, a product of Wako Shiyaku). The mixture was then heated in $N_2$ atmosphere at 180° C., followed by stirring with a nickel stirring rod for 30 minutes. Thereafter, the reactor was charged with a mixture comprising 36.5 mg $Me_4NOH$ ($3 \times 10^{-4}$ mole/BPA 1 mole) of a 15% aqueous solution of tetramethylammonium hydroxide $Me_4NOH$ (a product of Toyo Gosei) and 0.50 mg ($0.3 \times 10^{-4}$ mol/BPA 1 mole) of sodium hydrogencarbonate $NaHCO_3$ (guaranteed reagent, a product of Wako Shinyaku), and the contents of he reactor was stirred in $N_2$ atmosphere at 180° C. for 30 minutes to effect ester interchange reaction.

Subsequently, the reaction was continued continuously for 1 hour at 210° C. and a pressure gradually reduced to 200 mmHg, for 20 minutes at a temperature raised up to 240° C., for 20 minutes at a pressure gradually reduced to 150mmHg, for 20 minutes at a pressure reduced to 100 mmHg, and for 0.5 hours at a pressure reduced to 15 mmHg. The reaction was finally carried out for 2.5 hours at a temperature raised to 270° C. and a pressure reduced to 0.5 mm Hg, whereby a polycarbonate having IV of 0.58 was obtained.

The results obtained are shown in Table 2.

EXAMPLES 6-11 AND COMPARATIVE EXAMPLES 3-7

The same procedure as described in Example 5 was repeated except that in place of the sodium hydrogencarbonate, tetramethylammonium hydroxide and boric acid used in Example 5 in amounts as shown in Table 2, there were used nitrogen containing basic compounds, alkali metal compounds(alkaline earth metal compounds) and boric acid or boric acid esters in amounts as shown in Tables 2 and 3, respectively.

The results obtained are shown in Tables 2 and 3, respectively.

TABLE 2

|  | Ex. 5 | Ex. 6 | Ex. 7 | Ex. 8 | Ex. 9 | Ex. 10 | Ex. 11 |
|---|---|---|---|---|---|---|---|
| Catalyst |  |  |  |  |  |  |  |
| (a)Component | $Me_4NOH$ | $Me_4NOH$ | $Me_4NOH$ | $Me_4NOH$ | $Bu_4NOH$ | $Bu_4NBph_4$ | Ph—$CH_2(CH_3)_3NOH$ |
| amount($10^{-4}$ mole/BPA) | 3 | 3 | 3 | 3 | 4 | 2 | 1 |
| (b)Component | $NaHCO_3$ | $C_{17}H_{35}COOLi$ | $C_{17}H_{35}COONa$ | $NaOH$ | $NaHCO_3$ | $NaHCO_3$ | $NaHCO_3$ |
| amount($10^{-4}$ mole/BPA) | 0.3 | 0.3 | 0.3 | 0.3 | 0.2 | 0.2 | 0.2 |
| (c)Component | $H_3BO_3$ | $H_3BO_3$ | $H_3BO_3$ | $B(OPh)_3$ | $H_3BO_3$ | $H_3BO_3$ | $H_3BO_3$ |
| amount($10^{-4}$ mole/BPA) | 3 | 2 | 1 | 1 | 3 | 0 | 1 |
| Physical properties of the product |  |  |  |  |  |  |  |
| IV(dl/g) | 0.58 | 0.56 | 0.57 | 0.57 | 0.53 | 0.50 | 0.57 |
| Hue(b value) | 1.0 | 1.1 | 1.0 | 1.2 | 1.0 | 1.1 | 1.0 |
| Heat resistance (250° C., 16 hr. after) |  |  |  |  |  |  |  |
| IV(dl/g) | 0.50 | 0.49 | 0.48 | 0.48 | 0.48 | 0.40 | 0.55 |
| Hue(b value) | 21.3 | 21.2 | 22.0 | 23.5 | 21.0 | 24.0 | 22.0 |
| Boiling water resistance Tensile elongation (%) after boiling water immersion |  |  |  |  |  |  |  |
| 0 day after | 97.0 | 95.0 | 96.2 | 103.1 | 90.2 | 95.0 | 106.2 |
| 1 day after | 57.4 | 45.8 | 48.4 | 86.7 | 67.2 | 65.0 | 75.0 |
| 3 days after | 24.7 | 29.3 | 30.6 | 30.2 | 35.7 | 43.6 | 37.0 |
| 7 days after | 22.3 | 23.3 | 13.8 | 18.0 | 24.2 | 26.0 | 25.4 |

TABLE 3

|  |  | Comp. Ex. 3 | Comp Ex. 4 | Comp. Ex. 5 | Comp. Ex. 6 | Comp. Ex. 7 |
|---|---|---|---|---|---|---|
| Catalyst |  |  |  |  |  |  |
| (a) | Component | Me$_4$NOH | Me$_4$NOH | Me$_4$NOH | Me$_4$NOH | — |
|  | amount ($10^{-4}$ mole/BPA) | 3 | 100 | 30 | 100 | — |
| (b) | Component | — | — | NaHCO$_3$ | NaHCO$_3$ | NaHCO$_3$ |
|  | amount ($10^{-4}$ mole/BPA) | — | — | 30 | 100 | 100 |
| (c) | Component | H$_3$BO$_3$ | H$_3$BO$_3$ | H$_3$BO$_3$ | H$_3$BO$_3$ | — |
|  | amount ($10^{-4}$ mole/BPA) | 3 | 100 | 1 | 0 | 0 |
| Physical properties of the product |  |  |  |  |  |  |
| IV (dl/g) |  | 0.36 | 0.50 | 0.68 | 0.69 | 0.67 |
| Hue (b value) |  | 1.1 | 1.1 | 2.6 | 2.7 | 2.8 |
| Heat resistance (250° C., 16 hr · after) |  |  |  |  |  |  |
| IV (dl/g) |  | 0.29 | 0.33 | 0.54 | 0.45 | 0.43 |
| Hue (b value) |  | No molding can be formed | 30.0 | 39.0 | 37.0 | 38.1 |
| Boiling water resistance Tensile elongation (%) after boiling water immersion |  |  |  |  |  |  |
| 0 day after |  | 48.5 | 56.1 | 98.0 | 99.0 | 98.1 |
| 1 day after |  | 5.3 | 5.8 | 5.2 | 9.5 | 8.3 |
| 3 days after |  | 2.8 | 3.5 | 2.5 | 8.2 | 7.6 |
| 7 days after |  | 2.3 | 2.5 | 2.7 | 7.3 | 5.1 |

EXAMPLE 12

Diphenyl carbonate supplied by BAYER A.G. having a hydrolyzable chlorine content of 5.9 ppm was washed twice with hot water at a temperature of 80° C. and a pH of 7.0, and distilled under reduced pressure at a yield of 90% to provide diphenyl carbonate having a hydrolyzable chlorine content of less than 0.1 ppm.

In a 500 ml glass reactor 143.8 g(0.672 mole) of the so treated diphenyl carbonate, 136.8 g (0.600 mole) of Bisphenol A supplied by GE plastics Japan Ltd. having a hydrolyzable chlorine content of less than 0.1 ppm and 3.0 mg(H$_3$BO$_3$ $0.025\times 10^{-4}$ mole/mole of BPA) of 3% boric acid H$_3$BO$_3$ aqueous solution stirred using a stirrer made of Ni was heated to a temperature of 180° C. under a nitrogen atmosphere, followed by stirring for 30 minutes. At the end of the period there were added to the reactor 91.2 mg of 15% tetramethylammonium hydroxide Me$_4$NOH aqueous solution ($2.5\times 10^{-4}$ mole of Me$_4$NOH/mole of BPA) and 24.0 mg (NaOH $0.010\times 10^{-4}$ mole/mole of BPA) of 0.1% sodium hydroxide NaOH aqueous solution, and the mixture was stirred for further 30 minutes at a temperature of 180° C. under nitrogen atmosphere to effect the ester interchange reaction.

The reaction mixture was then heated to a temperature of 210 ° C. and the pressure was slowly reduced to 200 mmHg. The mixture was maintained under these conditions for 1 hour, and further maintained for 20 minutes at 240° C. and 200 mmHg. The pressure was then slowly reduced to 150 mmHg, and then the mixture was maintained at 240° C. for 20 minutes under this pressure and for 0.5 hour under 15 mmHg. Finally, the temperature was then raised to 270° C. and the pressure as reduced to 0.5 mmHg, and the reaction was continued under these conditions for 2.5 hours. Polycarbonate having an intrinsic viscosity of 0.55 (dl/g) was obtained substantially quantitatively. The b value of the product was 0.7.

The results are shown in Table 4 and Table 6.

EXAMPLES 13 AND 14

Diphenyl carbonates (DPC) having hydrolyzable chlorine, sodium ion and iron ion contents indicated in Table 4 were prepared in the same manner as in Example 12 except that the recovery yield of DPC at the stage of distillation under reduced pressure was varied. Using the so prepared DPC polycarbonates were prepared folloWing the procedures of Example 12.

The results are shown in Table 4.

EXAMPLE 15

Example 12 was repeated except that the purified DPC was replaced with DPC obtained by distillation of DPC supplied Eni company which had been prepared from dimethyl carbonate.

The results are shown in Table 4.

EXAMPLE 16

Example 12 was repeated except that the 0.1% sodium hydroxide NaOH aqueous solution was replaced with 50.4 mg (NaOH $0.02\times 10^{-4}$ mole/BPA 1 mole) of 0.2% sodium hydrogencarbonate NaHCO$_3$ aqueous solution.

The results are shown in Table 4.

EXAMPLE 17

Example 12 was repeated except that the 0.1% sodium hydroxide NaOH aqueous solution was replaced with 34.8 mg (NaOH $0.02\times 10^{-4}$ mole/BPA 1 mole) of 1% Lithium Stearate C$_{17}$H$_{35}$COOLi aqueous solution.

The results are shown in Table 4.

EXAMPLE 18

Example 12 was repeated except that the 0.1% sodium hydroxide NaOH aqueous solution was replaced with 43.2 mg

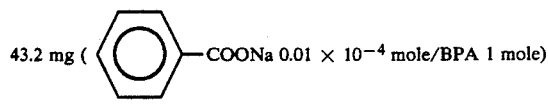

43.2 mg ( ⟨phenyl⟩—COONa 0.01 × $10^{-4}$ mole/BPA 1 mole)

of 0.2% sodium benzoate aqueous solution.

The results are shown in Table 5.

EXAMPLE 19

Example 12 was repeated except that the 0.1% sodium hydroxide NaOH aqueous solution was replaced with 42.6 mg (Na$_2$HPO$_4$ $0.005\times 10^{-4}$ mole/BPA 1 mole) of 0.1% disodium hydrogenphosphate aqueous solution.

The results are shown in Table 5.

EXAMPLE 20

Example 12 was repeated except that the 0.1% sodium hydroxide NaOH aqueous solution was replaced with 39.9 mg 39.9 mg (NaO—⟨⟩—|—⟨⟩—ONa 0.005 ×

$10^{-4}$ mole/BPA 1 mole)

of 0.2% disodium salt of BPA in tetrahydrofuran solution.

The results are shown in Table 5.

COMPARATIVE EXAMPLE 8

Example 12 was repeated except that the unpurified DPC as such was used in the melt polycondensation.

The results are shown in Table 5.

COMPARATIVE EXAMPLE 9

Example 12 was repeated except that instead of the purified DPC undistilled DPC supplied by Eni company was used in the melt polycondensation.

The results are shown in Table 5.

TABLE 4

| | Starting material | Ex. 12 | Ex. 13 | Ex. 14 | Ex. 15 | Ex. 16 | Ex. 17 |
|---|---|---|---|---|---|---|---|
| Starting material | DPC Hydrolyzable Cl (ppm) | <0.10 | 0.13 | 0.25 | <0.10 | <0.10 | <0.10 |
| | Na ion (ppm) | <0.05 | <0.05 | <0.05 | <0.05 | <0.05 | <0.05 |
| | Fe ion (ppm) | <0.05 | <0.05 | <0.05 | <0.05 | <0.05 | <0.05 |
| | Bisphenol A | | | | | | |
| | Hydrolyzable Cl (ppm) | <0.10 | <0.10 | <0.10 | <0.10 | <0.10 | <0.10 |
| | Na ion (ppm) | <0.05 | <0.05 | <0.05 | <0.05 | <0.05 | <0.05 |
| | Fe ion (ppm) | <0.05 | <0.05 | <0.05 | <0.05 | <0.05 | <0.05 |
| Physical properties of the product | IV (dl/g) | 0.55 | 0.54 | 0.54 | 0.55 | 0.56 | 0.56 |
| | b value | 0.7 | 0.8 | 0.9 | 0.7 | 0.8 | 0.7 |
| | Heat resistance 250° C. × 16 hr IV (dl/g) | 0.51 | 0.49 | 0.50 | 0.50 | 0.52 | 0.52 |
| | color tone b value | 17.3 | 19.2 | 20.3 | 17.5 | 18.3 | 19.2 |
| | Boiling water resistance | | | | | | |
| | Elongation (%) after in boiling water for | | | | | | |
| | 0 day | 99.3 | 98.2 | 105.2 | 102.1 | 103.0 | 107.3 |
| | 1 day | 95.2 | 90.3 | 83.4 | 96.3 | 90.4 | 93.5 |
| | 3 day | 88.4 | 82.6 | 78.6 | 89.1 | 82.7 | 80.8 |
| | 7 day | 75.3 | 72.4 | 69.5 | 76.7 | 71.3 | 70.9 |

TABLE 5

| | Starting material | Ex. 18 | Ex. 19 | Ex. 20 | Comp. Ex. 8 | Comp. Ex. 9 |
|---|---|---|---|---|---|---|
| Starting material | DPC Hydrolyzable Cl (ppm) | <0.10 | <0.10 | <0.10 | 5.90 | 4.12 |
| | Na ion (ppm) | <0.05 | <0.05 | <0.05 | 0.10 | 0.92 |
| | Fe ion (ppm) | <0.05 | <0.05 | <0.05 | 0.40 | 1.05 |
| | Bisphenol A | | | | | |
| | Hydrolyzable Cl (ppm) | <0.10 | <0.10 | <0.10 | <0.10 | <0.10 |
| | Na ion (ppm) | <0.05 | <0.05 | <0.05 | <0.05 | <0.05 |
| | Fe ion (ppm) | <0.05 | <0.05 | <0.05 | <0.05 | <0.05 |
| Physical properties of the product | IV (dl/g) | 0.54 | 0.53 | 0.55 | 0.56 | 0.56 |
| | b value | 0.7 | 0.6 | 0.7 | 1.5 | 1.6 |
| | Heat resistance 250° C. × 16 hr IV (dl/g) | 0.51 | 0.51 | 0.51 | 0.46 | 0.47 |
| | color tone b value | 17.0 | 16.9 | 17.4 | 30.5 | 31.2 |
| | Boiling water resistance | | | | | |
| | Elongation (%) after in boiling water for | | | | | |
| | 0 day | 102.4 | 99.5 | 103.2 | 93.2 | 95.4 |
| | 1 day | 96.4 | 93.2 | 95.4 | 53.2 | 51.3 |
| | 3 day | 89.7 | 89.1 | 88.3 | 22.9 | 25.3 |
| | 7 day | 76.4 | 72.4 | 74.5 | 13.4 | 14.7 |

EXAMPLES 21-36 AND COMPARATIVE EXAMPLES 10-14

The same procedure as described in Example 12 as repeated except that in place of the sodium hydroxide, tetramethylammonium hydroxide and boric acid used in Example 12 in amounts as shown in Table 4, there were used nitrogen containing basic compounds, alkali metal compounds(alkaline earth metal compounds) and boric acid or boric acid esters in amounts as shown in Tables 6-9 and 10, respectively.

The results obtained are shown in Tables 6-9 and 10, respectively.

TABLE 6

| | | Ex. 12 | Ex. 21 | Ex. 22 | Ex. 23 | Ex. 24 | Ex. 25 | Ex. 26 |
|---|---|---|---|---|---|---|---|---|
| Catalyst | | | | | | | | |
| (a) | Component | Me₄NOH | Me₄NOH | Me₄NOH | Me₄NOH | Me₄NOH | Me₄NOH | Me₄NOH |
| | amount ($10^{-4}$ mole/BPA) | 2.5 | 2.5 | 2.5 | 2.5 | 2.5 | 2.5 | 2.5 |

TABLE 6-continued

|  |  | Ex. 12 | Ex. 21 | Ex. 22 | Ex. 23 | Ex. 24 | Ex. 25 | Ex. 26 |
|---|---|---|---|---|---|---|---|---|
| (b) | Component | NaOH | $C_{17}H_{35}$COONa | $C_{17}H_{35}$COOLi | $NaHCO_3$ | NaOH | NaOH | KOH |
|  | amount ($10^{-4}$ mole/BPA) | 0.010 | 0.010 | 0.010 | 0.010 | 0.010 | 0.025 | 0.050 |
| (c) | Component | $H_3BO_3$ | $H_3BO_3$ | $H_3BO_3$ | $H_3BO_3$ | $B(OPh)_3$ | $H_3BO_3$ | $H_3BO_3$ |
|  | amount ($10^{-4}$ mole/BPA) | 0.025 | 0.025 | 0.025 | 0.025 | 0.025 | 0.025 | 0.025 |
| Physical properties of the product |  |  |  |  |  |  |  |  |
| IV (dl/g) |  | 0.55 | 0.52 | 0.51 | 0.53 | 0.56 | 0.58 | 0.60 |
| Hue (b value) |  | 0.7 | 0.7 | 0.7 | 0.8 | 0.7 | 0.8 | 1.0 |
| Heat resistance (250° C., 16 hr · after) |  |  |  |  |  |  |  |  |
| IV (dl/g) |  | 0.51 | 0.49 | 0.48 | 0.50 | 0.52 | 0.54 | 0.55 |
| Hue (b value) |  | 17.3 | 17.8 | 17.2 | 17.9 | 17.4 | 18.3 | 19.4 |
| Boiling water resistance Tensile elongation (%) after boiling water immersion |  |  |  |  |  |  |  |  |
| 0 day after |  | 99.3 | 103.1 | 95.7 | 96.7 | 102.3 | 107.5 | 107.9 |
| 1 day after |  | 95.2 | 93.4 | 91.3 | 90.3 | 95.4 | 88.4 | 81.9 |
| 3 days after |  | 88.4 | 82.7 | 81.7 | 81.2 | 86.7 | 79.3 | 71.3 |
| 7 days after |  | 75.3 | 73.9 | 71.8 | 73.4 | 76.9 | 67.4 | 59.2 |

TABLE 7

|  |  | Comp. Ex. 10 | Comp. Ex. 11 | Comp. Ex. 12 | Comp. Ex. 13 | Comp. Ex. 14 |
|---|---|---|---|---|---|---|
| Catalyst |  |  |  |  |  |  |
| (a) | Component | $Me_4NOH$ | $Me_4NOH$ | $Me_4NOH$ | $Me_4NOH$ | — |
|  | amount ($10^{-4}$ mole/BPA) | 2.5 | 100 | 30 | 100 | — |
| (b) | Component | — | — | NaOH | NaOH | NaOH |
|  | amount ($10^{-4}$ mole/BPA) | — | — | 15 | 30 | 30 |
| (c) | Component | $H_3BO_3$ | $H_3BO_3$ | $H_3BO_3$ | — | — |
|  | amount ($10^{-4}$ mole/BPA) | 0.025 | 100 | 1 | — | — |
| Physical properties of the product |  |  |  |  |  |  |
| IV (dl/g) |  | 0.36 | 0.43 | 0.68 | 0.69 | 0.67 |
| Hue (b value) |  | 0.8 | 0.9 | 2.4 | 2.6 | 2.7 |
| Heat resistance (250° C., 16 hr · after) |  |  |  |  |  |  |
| IV (dl/g) |  | 0.30 | 0.34 | 0.55 | 0.45 | 0.43 |
| Hue (b value) |  | No molding can be formed | 23.3 | 35.2 | 29.3 | 28.4 |
| Boiling water resistance Tensile elongation (%) after boiling water immersion |  |  |  |  |  |  |
| 0 day after |  | 65.3 | 73.2 | 98.0 | 104.5 | 101.5 |
| 1 day after |  | 5.3 | 17.6 | 3.1 | 1.5 | 1.2 |
| 3 days after |  | 3.5 | 10.5 | 2.6 | 1.8 | 1.3 |
| 7 days after |  | 2.3 | 5.9 | 1.7 | 1.3 | 0.9 |

TABLE 8

|  | Ex. 27 | Ex. 28 | Ex. 20 |
|---|---|---|---|
| Catalyst |  |  |  |
| (a)Component | $Bu_4NOH$ | $Bu_4NBPh_4$ | 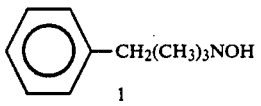 |
| amount($10^{-4}$ mole/BPA) | 2.5 | 2.5 |  |
| (b)Component | LiOH | NaOH | NaOH |
| amount($10^{-4}$ mole/BPA) | 0.010 | 0.010 | 0.010 |
| (c)Component | $H_3BO_3$ | — | $H_3BO_3$ |
| amount($10^{-4}$ mole/BPA) | 0.025 | — | 0.025 |
| Physical properties of the product |  |  |  |
| IV(dl/g) | 0.56 | 0.57 | 0.55 |
| Hue(b value) | 0.7 | 0.7 | 0.8 |
| Heat resistance (250° C., 16 hr. after) |  |  |  |
| IV(dl/g) | 0.51 | 0.52 | 0.51 |
| Hue(b value) | 17.2 | 17.7 | 17.4 |
| Boiling water resistance Tensile elongation (%) after boiling water immersion |  |  |  |
| 0 day after | 103.4 | 99.5 | 101.5 |
| 1 day after | 94.7 | 95.3 | 93.3 |
| 3 days after | 84.9 | 83.3 | 84.1 |
| 7 days after | 74.6 | 76.7 | 72.6 |

TABLE 9

|  | Ex. 30 | Ex. 31 | Ex. 32 | Ex. 33 | Ex. 34 |
|---|---|---|---|---|---|
| Catalyst | | | | | |
| (a) Component | $Me_4NOH$ | $Me_4NOH$ | $Me_4NOH$ | $Me_4NOH$ | $Me_4NOH$ |
| amount ($10^{-4}$ mole/BPA) | 2.5 | 2.5 | 2.5 | 2.5 | 2.5 |
| (b) Component | $NaHCO_3$ | NaOH | NaOH | KOH | LiOH |
| amount ($10^{-4}$ mole/BPA) | 0.250 | 0.250 | 0.010 | 0.010 | 0.010 |
| (c) Component | $H_3BO_3$ | $H_3BO_3$ | — | — | — |
| amount ($10^{-4}$ mole/BPA) | 1.000 | 1.000 | — | — | — |
| Physical properties of the product | | | | | |
| IV (dl/g) | 0.61 | 0.63 | 0.55 | 0.56 | 0.55 |
| Hue (b value) | 1.1 | 1.1 | 0.7 | 0.8 | 0.7 |
| Heat resistance (250° C., 16 hr · after) | | | | | |
| IV (dl/g) | 0.55 | 0.56 | 0.49 | 0.50 | 0.49 |
| Hue (b value) | 21.3 | 22.4 | 15.2 | 15.7 | 15.1 |
| Boiling water resistance | | | | | |
| Tensile elongation (%) after boiling water immersion | | | | | |
| 0 day after | 103.1 | 101.2 | 104.7 | 102.5 | 98.7 |
| 1 day after | 86.7 | 87.3 | 90.2 | 93.4 | 83.4 |
| 3 days after | 57.4 | 45.4 | 81.4 | 85.3 | 79.2 |
| 7 days after | 24.2 | 23.3 | 64.2 | 69.5 | 61.8 |

TABLE 10

|  | Ex. 35 | Ex. 36 | Ex. 18 | Ex. 19 | Ex. 20 |
|---|---|---|---|---|---|
| Catalyst | | | | | |
| (a) Component | $Me_4NOH$ | $Me_4NOH$ | $Me_4NOH$ | $Me_4NOH$ | $Me_4NOH$ |
| amount ($10^{-4}$ mole/BPA) | 2.5 | 2.5 | 2.5 | 2.5 | 2.5 |
| (b) Component | $C_{17}H_{35}COONa$ | $C_{17}H_{35}COOLi$ | 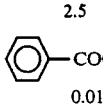 | $Na_2HPO_4$ | 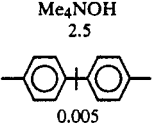 |
| amount ($10^{-4}$ mole/BPA) | 0.010 | 0.010 | 0.010 | 0.005 | 0.005 |
| (c) Component | — | — | $H_3BO_3$ | $H_3BO_3$ | $H_3BO_3$ |
| amount ($10^{-4}$ mole/BPA) | — | — | 0.025 | 0.025 | 0.025 |
| Physical properties of the product | | | | | |
| IV (dl/g) | 0.53 | 0.52 | 0.54 | 0.53 | 0.55 |
| Hue (b value) | 0.7 | 0.7 | 0.7 | 0.6 | 0.7 |
| Heat resistance (250° C., 16 hr. after) | | | | | |
| IV (dl/g) | 0.48 | 0.47 | 0.51 | 0.51 | 0.51 |
| Hue (b value) | 15.4 | 15.3 | 17.0 | 16.9 | 17.4 |
| Boiling water resistance | | | | | |
| Tensile elongation (%) after boiling water immersion | | | | | |
| 0 day after | 99.8 | 97.1 | 102.4 | 99.5 | 103.2 |
| 1 day after | 92.5 | 85.4 | 96.4 | 93.2 | 95.4 |
| 3 days after | 83.4 | 80.0 | 89.7 | 89.1 | 88.3 |
| 7 days after | 67.3 | 63.2 | 76.4 | 72.4 | 74.5 |

What is claimed is:

1. A process for preparing polycarbonates by melt polycondensation of at least one aromatic dihydroxy compound and at least one carbonic acid diester in the presence of a catalyst comprising
   (a) a nitrogen containing basic compound,
   (b) from $10^{-8}$ to $10^{-3}$ mole, based on 1 mole of the aromatic dihydroxy compound, of an alkali metal or alkaline earth metal compound, and
   (c) boric acid or boric ester.

2. The process as claimed in claim 1, wherein the catalyst comprises, based on 1 mole of the aromatic dihydroxy compound,
   (a) from $10^{-6}$ to $10^{-1}$ mole of the nitrogen containing basic compound,
   (b) from $10^{-8}$ to $10^{-3}$ mole of the alkali metal or alkaline earth metal compound, and
   (c) from $10^{-8}$ to $10^{-1}$ mole of the boric acid or boric acid ester.

3. The process as claimed in claim 1, wherein the catalyst comprises, based on 1 mole of the aromatic dihydroxy compound,
   (a) from $10^{-5}$ to $10^{-2}$ mole of the nitrogen containing basic compound,
   (b) from $10^{-7}$ to $10^{-4}$ mole of the alkali metal or alkaline earth metal compound, and
   (c) from $10^{-7}$ to $10^{-2}$ mole of the boric acid or boric acid ester.

4. The process as claimed in claim 1, wherein the catalyst comprises, based on 1 mole of the aromatic dihydroxy compound,
   (a) from $10^{-5}$ to $10^{-2}$ mole of the nitrogen containing basic compound,
   (b) from $10^{-7}$ to $10^{-5}$ mole of the alkali metal or alkaline earth metal compound, and
   (c) from $10^{-6}$ to $10^{-4}$ mole of the boric acid or boric acid ester.

5. The process of claim 1 wherein the nitrogen containing basic compound is selected from the group consisting of tetraalkylammonium hydroxides, tetraarylammonium hydroxides, tetraalkylarylammonium hydroxides, tertiary amines, secondary amines, primary amines, ammonia or basic ammonium salts.

6. The process of claim 2 wherein the nitrogen containing basic compound is selected from the group consisting of tetraalkylammonium hydroxides, tetraarylammonium hydroxides, tetraalkylarylammonium hydroxides, tertiary amines, secondary amines, primary amines, ammonia or basic ammonium salts.

7. The process of claim 2 wherein the nitrogen containing basic compound is a tetraalkylammonium hydroxide.

8. The process of claim 1 wherein the catalyst component (c) is boric acid.

9. The process of claim 1 wherein compound (c) is a boric acid ester of the formula $B(OR)_2(OH)_{3-n}$ wherein R is an alkyl group or an aryl group and n is 1, 2 or 3.

10. The process of claim 2 wherein component (c) is boric acid or a boric acid ester of the formula $B(OR)_n(OH)_{3-n}$ wherein R is an alkyl group or an aryl group and n is 1, 2 or 3.

11. The process of claim 1 wherein the combined content of hydrolyzable chlorine present in the starting aromatic hydroxy compound and carbonic diester compound is not more than 3 ppm.

12. The process of claim 1 wherein the combined content of hydrolyzable chlorine present in the starting aromatic hydroxy compound and carbonic diester compound is not more than 3 ppm.

13. The process of claim 1 wherein the combined contents of hydrolyzable chlorine, sodium ion and iron ion in the starting aromatic hydroxy compound and carbonic acid diesters is not more than 3 ppm, not more than 1.0 ppm and not more than 1.0 ppm, respectively.

* * * * *